United States Patent
Yoon et al.

(10) Patent No.: US 9,672,344 B2
(45) Date of Patent: Jun. 6, 2017

(54) COMPUTING APPARATUS AND METHOD FOR OPERATING APPLICATION USING RETRIEVED LOGIN INFORMATION

(71) Applicant: SAMSUNG ELECTRONICS CO., LTD., Suwon-si (KR)

(72) Inventors: Yeo-ri Yoon, Suwon-si (KR); Sang-hee Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 13/716,642

(22) Filed: Dec. 17, 2012

(65) Prior Publication Data
US 2013/0160113 A1    Jun. 20, 2013

(30) Foreign Application Priority Data
Dec. 15, 2011    (KR) .................. 10-2011-0135454

(51) Int. Cl.
*G06F 21/35*    (2013.01)
*G06F 21/31*    (2013.01)
(Continued)

(52) U.S. Cl.
CPC .............. *G06F 21/35* (2013.01); *G06F 21/31* (2013.01); *G06F 21/34* (2013.01); *H04L 63/0853* (2013.01)

(58) Field of Classification Search
CPC .......... G06F 21/31; G06F 21/34; G06F 21/35; G06F 21/629; G06F 21/41;
(Continued)

(56) References Cited

U.S. PATENT DOCUMENTS

| 7,908,155 B2 | 3/2011 | Fuerst et al. |
| 8,738,687 B2 | 5/2014 | Nakajima |

(Continued)

FOREIGN PATENT DOCUMENTS

| CN | 101997906 A | 3/2011 |
| JP | 2003-36247 A | 2/2003 |

(Continued)

OTHER PUBLICATIONS

Communication dated May 13, 2014 issued by the European Patent Office in counterpart European Application No. 12197235.0.

(Continued)

*Primary Examiner* — Theodore C Parsons
(74) *Attorney, Agent, or Firm* — Sughrue Mion, PLLC

(57) ABSTRACT

Computing apparatus and method for operating an application are provided. The computing apparatus includes: a communicator which communicates with a paired external device; a storage unit in which applications are installed; a controller which, if one of the applications installed in the storage unit is selected, controls the communicator to request login information corresponding to the selected application from the external device and, if the login information is received from the external device, performs a login by using the login information; and a display unit which displays an operation screen corresponding to the selected application. Therefore, a user further easily and conveniently uses services of applications respectively installed devices.

22 Claims, 5 Drawing Sheets

(51) Int. Cl.
*G06F 21/34* (2013.01)
*H04L 29/06* (2006.01)

(58) Field of Classification Search
CPC ..... G06F 2221/2141; G06F 2221/2153; H04L 63/0853
USPC .................................................... 726/19–20
See application file for complete search history.

(56) References Cited

U.S. PATENT DOCUMENTS

| | | | |
|---|---|---|---|
| 2002/0145632 | A1 | 10/2002 | Shmueli et al. |
| 2003/0084288 | A1* | 5/2003 | de Jong et al. ............... 713/168 |
| 2004/0128389 | A1* | 7/2004 | Kopchik ........................ 709/228 |
| 2004/0177258 | A1* | 9/2004 | Ong ............................... 713/192 |
| 2007/0157298 | A1* | 7/2007 | Dingwall et al. ................. 726/8 |
| 2008/0184339 | A1 | 7/2008 | Shewchuk et al. |
| 2008/0289030 | A1* | 11/2008 | Poplett ........................... 726/15 |
| 2009/0222908 | A1* | 9/2009 | Warren ........................... 726/18 |
| 2010/0005508 | A1* | 1/2010 | Yang ................................ 726/2 |
| 2011/0029488 | A1 | 2/2011 | Fuerst et al. |
| 2011/0040862 | A1 | 2/2011 | Nakajima |
| 2012/0329388 | A1* | 12/2012 | Royston et al. ............ 455/41.1 |
| 2014/0215048 | A1 | 7/2014 | Nakajima |

FOREIGN PATENT DOCUMENTS

| | | |
|---|---|---|
| JP | 2005-522768 A | 7/2005 |
| JP | 2006-309355 A | 11/2006 |
| JP | 2011-244122 A | 12/2011 |

OTHER PUBLICATIONS

Communication dated Oct. 24, 2016 issued by the Japanese Patent Office in counterpart Japanese Patent Application No. 2012-270103.
Communication dated Nov. 21, 2016 issued by the State Intellectual Property Office of P.R. China in counterpart Chinese Patent Application No. 201210548613.X.

\* cited by examiner

COMPUTING APPARATUS AND METHOD FOR OPERATING APPLICATION USING RETRIEVED LOGIN INFORMATION

CROSS-REFERENCE TO RELATED APPLICATION(S)

This application claims priority under 35 U.S.C. §119 from Korean Patent Application No. 10-2011-0135454, filed on Dec. 15, 2011, in the Korean Intellectual Property Office, the disclosure of which is incorporated herein by reference in its entirety.

BACKGROUND

1. Field

The present general inventive concept generally relates to computing apparatus and method, and more particularly, to computing apparatus and method for improving an operation environment of an application.

2. Description of the Related Art

In general, as Internet applications become more ubiquitous, a computing apparatus or a portable terminal device, such as a smart television (TV), a mobile device, or a tablet personal computer (PC), may operate various types of applications such as FACEBOOK™, TWITTER™, e-mail services, etc. In other words, a user may install and use various types of applications through a computing apparatus or a portable terminal device which enables the user to access services through the Internet.

However, in order to use such an application in each device, login information is to be input into each device in which the corresponding application is installed. For example, when an application is installed in a mobile device and a table PC, a user may log into the application through the mobile device to use a service. In order to use the application through the tablet PC when also using the service through the mobile device, the user is to input login information of the application installed in the tablet PC.

Even if the same application is installed in each device, the user is to input login information all the times in order to operate the application in a corresponding device. The number of times a user must input login information grows as both the number of Internet-connected devices and the number of online applications grow.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide computing apparatus and method for assisting a user in further conveniently using a service such as an application.

According to an aspect of the exemplary embodiments, there is provided a computing apparatus. The computing apparatus may include: a communicator which communicates with a paired external device; a storage unit in which applications are installed; a controller which controls the communicator to request login information corresponding to an application from the external device and performs a login by using the login information; and a display unit which displays an operation screen corresponding to the selected application.

The controller may search the storage unit for the login information corresponding to the selected application, and if the login information is stored in the storage unit, perform the login by using the searched login information, and if the login information is not stored in the storage unit, control the communicator to request the login information from the external device.

The computing apparatus may further include a pairing processor which performs pairing with the external device. The storage unit may store pairing information including identification information of at least one external device. The pairing processor may read the pairing information of the external device from the storage unit, perform pairing with the external device by using the stored pairing information, and search for a peripheral device, which can be paired, through the communicator.

The storage unit may store pairing information including identification information of a plurality of external devices. If the login information is not received from the external device, the pairing processor may perform pairing with another external device, which may operate the selected application, according to the device information stored in the storage unit.

If pairing request information is received from the external device through the communicator, the pairing processor may transmit pairing information including identification information for performing pairing to the external device which has transmitted the pairing request information.

The controller may transmit login information of an application related to the login information request message from the storage unit to another external device.

According to another aspect of the exemplary embodiments, there is provided a method of operating an application in a computing apparatus. The method may include: performing pairing with an external device; requesting login information corresponding to an application from the external device, and if the requested login information is received, performing a login by using the received login information; and if the login is completed, displaying an operation screen corresponding to the selected application.

The performing of the login may include: if one of the pre-installed applications is selected, determining whether login information corresponding to the selected application has been stored in the storage unit; and if the login information has been stored in the storage unit, performing the login for operating the selected application by using the login information, and if the login information has not been stored in the storage unit, requesting the login information from the external device.

The method may further include: receiving a pairing request from the external device; and performing pairing with the external device. The performing of the pairing may include: reading pairing information of at least external device from the storage unit which stores the pairing information including identification information of the at least one external device, performing pairing with the external device by using the pairing information, and if the pairing information of the external device has not been stored in the storage unit, searching for a peripheral device which can be paired.

The storage unit may store operable device information for a plurality of external devices. If the login information is not received from the external device, the method may further include pairing with another device, which may operate the selected application, according to the device information stored in the storage unit.

The method may further include: if pairing request information is received from the external device, transmitting pairing information including identification information for performing pairing to the external device which has transmitted the pairing request information.

The method may further include: if a login information request message for operating an application is received from the paired external device, transmitting login information of the application to the external device.

According to another aspect of an exemplary embodiment, there is provided a computing apparatus, including a communication unit which may communicate with a first external device, and a processing unit which may control the communications unit to request login information corresponding to an application from the first external device, perform a login by using the login information, and output an image signal corresponding to the application.

The computing apparatus may further include a storage unit which stores login information corresponding to a plurality of applications. The processing unit may determine whether the login information corresponding to one of the plurality of applications is stored in the storage unit. If the login information is not stored in the storage unit, the processing unit may control the communication unit to request the login information from the first external device.

The storage unit may store pairing information including identification information of the first external device. The communication unit may receive a pairing request from the first external device, and the processing unit may read the pairing information of the first external device from the storage unit and perform pairing with the first external device using the pairing information.

The storage unit may store pairing information including identification information of a plurality of external devices. If the login information is not received from the first external device, the processor may search for a second external device through the communicator and perform pairing with the second external device according to the device information stored in the storage unit.

The computing apparatus may further include a display unit which displays the application and/or an input unit which receives user input.

The communication unit may send and receives data over a network

The processing unit may transmit login information stored on the storage unit to a second external device through the communication unit.

As described above, according to the various exemplary embodiments, if login information of an application corresponding to a request of a user has not been stored, the computing apparatus may receive the login information of the corresponding application from a peripheral external device to perform a login or may provide the requested login information of the application to an external device. In other words, the computing apparatus may operate each of applications installed in a plurality of devices by using one piece of login information. Therefore, the user may further conveniently use a service such as an application.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
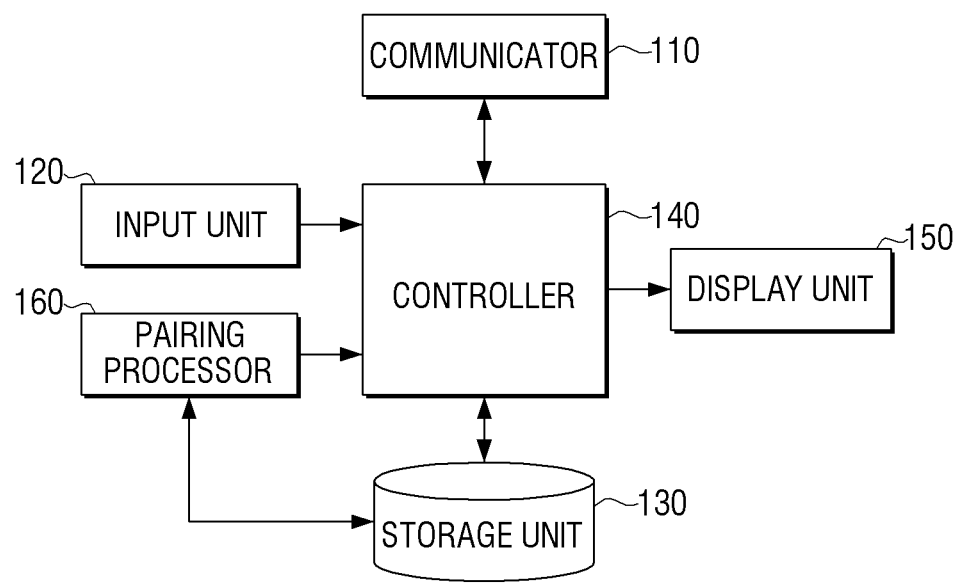
FIG. 1 is a block diagram of a computing apparatus according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram of a computing apparatus according to exemplary embodiments of the present disclosure.

Referring to FIG. 1, the computing apparatus includes a communicator 110, an input unit 120, a storage unit 130, a controller 140, and a display unit 150. The communicator 110 performs communicates with a paired external device through a wired connection, a wireless connection over a network, etc. For example, the communicator 110 may communicate via near field communication (NFC) such as Bluetooth, WiFi, etc. The external device may be any electronic device. For example, the external device may be a wireless communication terminal device such as a mobile device, a tablet personal computer (PC), etc. and may include the same wireless communication module as the computing apparatus. The communicator 110 may perform communication related to data transmission and reception, including accessing the Internet, as well as communication with one or more external devices as mentioned above.

The input unit 120 may be internal or external. For example, the input unit 120 may be a mouse, a keyboard, a remote control, a touchpad, a touch screen, a button, etc. of the computing apparatus. The input unit receives user control commands. The storage unit 130 stores setup information of at least one application which is operable in the computing apparatus. Applications may be stored in the storage unit 130 or may be stored online and accessed over the Internet through a browser or other means.

If one of the applications installed in the storage unit 130 is selected, the controller 140 controls the communicator 110 to request login information corresponding to the selected application from the paired external device. If the login information is received from the paired external device through the communicator 110, the controller 140 authenticates a login of the corresponding application by using the received login information. If the login of the application is completed as described above, the controller 140 outputs an image signal to the display unit 150 such that the display unit 150 may display an operation screen corresponding to the logged-in application.

The controller 140 may be embodied in a hardware processor or processors, such as a central processing unit, graphics processing unit, etc. The display unit 150 may be embodied in an externally connected display or an internal monitor, such as display of a tablet computer, mobile phone, notebook computer, etc. The storage unit 130 may be embodied in volatile or nonvolatile memory. The storage unit 130 may be embodied in an internally-connected storage or may be external storage connected via a wired connection, a wireless connection, or over a network.

In detail, the user may request an application list to operate one of the applications which are operable in the computing apparatus. If this request is input through the input unit 120, the controller 140 outputs an image signal to the display unit 150 to display an application list of all of the application stored in the storage unit 130. Therefore, the user may select one application from the application list displayed on the display unit 150 through the input unit 120.

However, the disclosure is not limited thereto, and the user may request an application that the user wants to use, not the application list.

If one of a plurality of applications stored in the storage unit 130 is selected according to a request of the user as described above, the controller 140 searches the storage unit 130 for login information necessary for activating the selected application. If the login information corresponding to the selected application is stored in the storage unit 130 according to the search result, the controller 140 performs a login by using the corresponding login information.

If the login information corresponding to the selected application is not stored in the storage unit 130 according to the search result, the controller 140 controls the communicator 110 to request login information for a login of the corresponding application from the paired external device.

The communicator 110 transmits a login information request message including identification information of the application selected by the user to the paired external device according to a control command of the controller 140. If a response message including the login information of the corresponding application is received from the paired external device through the communicator 110, the controller 140 may perform a login of the application selected by the user by using the received login information.

As described above, although login information for an automatic operation of an application installed in the storage 130 is not stored, the computing apparatus according to the present exemplary embodiment may receive login formation for the automatic operation of the corresponding application from an external device to perform a login of the application. Therefore, the user does not have to input login information of the same application into each device.

The computing apparatus according to the present exemplary embodiment further includes a pairing processor 160. If a pairing request of the external device is input through the input unit 120, the pairing processor 160 may perform pairing with an external device corresponding to the input pairing request. The pairing processor 160 may be embodied in a hardware processor or processors, such as a central processing unit, graphics processing unit, etc. The pairing processor 160 and the controller 140 may be embodied in a single device or separate devices.

In detail, if a pairing request of an external device is input through the input unit 120 according to a request of the user, the pairing processor 160 determines whether pairing information of the external device corresponding to the input pairing request is stored in the storage unit 130. Here, as described above, the storage unit 130 stores setup information of installed applications and login information for an automatic operation of at least one of the installed applications. The storage unit 130 additionally stores pairing information including identification information of at least one external device. In other words, if the computing apparatus has a history of having been paired with at least one external device, the storage unit 130 may store pairing information including identification information of the corresponding external device.

Therefore, in order to determine whether the computing apparatus has a history of having performed pairing with the external device according to a request of the user, the pairing processor 160 determines whether pairing information of the corresponding external device has been stored, with reference to the storage unit 130. If it is determined that the pairing information of the external device to be paired has been stored in the storage unit 130, the pairing processor 160 reads the pairing information of the corresponding external device from the storage unit 130 and performs pairing with the external device by using the stored pairing information.

The computing apparatus may pair with one or more external devices using any wireless or wired communication protocol.

If it is determined that the pairing information of the external device has not been stored in the storage unit 130, the pairing processor 160 searches for peripheral devices, which may be paired, through the communicator 110 and displays a list of searched peripheral devices on a screen through the display unit 150. If one peripheral device of the displayed list of peripheral devices is selected by the user, the pairing processor 160 performs pairing with the selected peripheral device and stores pairing information of the paired peripheral device in the storage unit 130. If pairing request information is received from an external device through the communicator 110, the pairing processor 160 may transmit pairing information including identification information thereof stored in the storage unit 130 to the external device which has transmitted the pairing request information.

If pairing with an external device requested by the user is achieved through the pairing processor 160 as described above, the controller 140 may receive login information of an application selected by the user from the paired external device and perform an automatic login of the application by using the received login information as described above.

The above-described operation will now be described in more detail.

Figure 2:
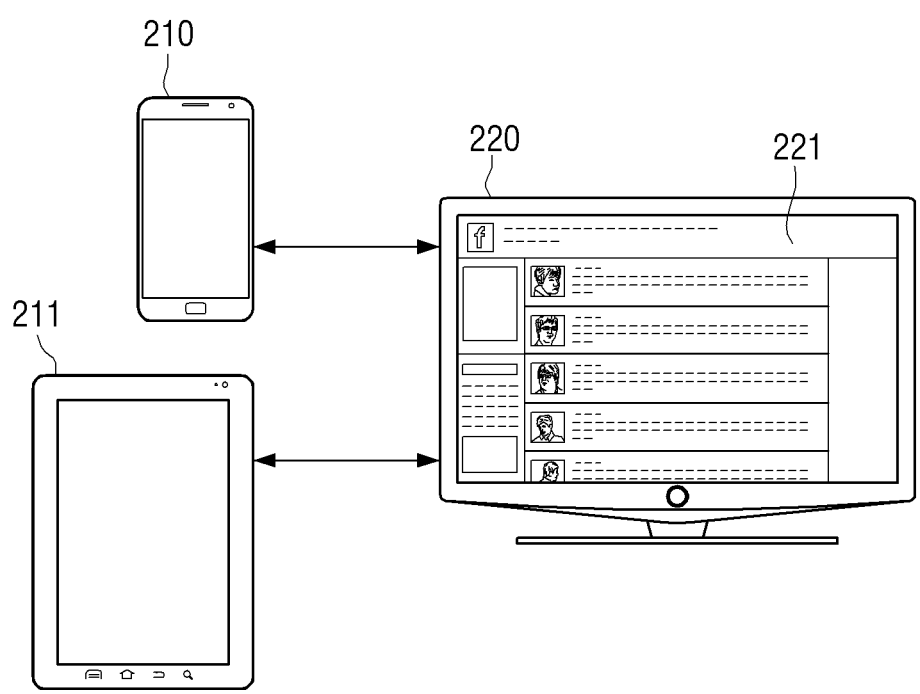
FIG. 2 is a view illustrating an operation of operating an application by using login information stored in a paired external device in a computing apparatus according to an exemplary embodiment.

FIG. 2 is a view illustrating an operation of operating an application by using login information stored in a paired external device in a computing apparatus according to an exemplary embodiment.

As shown in FIG. 2, a computing apparatus 220 and a mobile device 210 may be paired with each other. When the computing apparatus 220 and the mobile device 210 are paired with each other as described above, a user may select an application from a plurality of applications installed in the computing apparatus 220 by using a remote control device such as a remote controller. If such a selection command is input, the computing apparatus 220 transmits a login information request message of the application to the mobile device 210 paired with the computing apparatus 220 in order to operate the application. The mobile device 210 receives the login information request message and transmits pre-stored login information of the application with reference to identification information included in the login information request message. Application program may be installed in and the login information of the application may be stored in the mobile device 210 which transmits the login information of the application to the computing apparatus 220. The computing apparatus 220 may be embodied in a television, desktop computer, notebook computer, tablet computer, mobile telephone, etc.

However, the disclosure concept is not limited thereto, and even if the login information of the application is stored in the mobile device 210, the mobile device 210 may transmit the login information of the application. In other words, if the application "Facebook" is currently logged in and is being operated on the mobile device 210, the mobile device 210 may transmit the login information of the application "Facebook" to the computing apparatus 220.

If login information is not received from an external device which has requested the login information, the pairing processor 160 may perform pairing with an external device (hereinafter, referred to as another device), in which the corresponding application is installed, according to a control command of the controller 140. In detail, the storage unit 130 may store pairing information of paired external devices and device information of each of the paired external devices. Here, the device information may be application information installed in each of the external devices.

Therefore, if requested login information is not received from a first paired external device within a preset threshold time, the controller 140 determines that login information for automatically executing a corresponding application is not stored in the first paired external device and controls the pairing processor 160 to perform pairing with another device. According to such a control command, the pairing processor 160 reads pairing information of another device in which an application requested by the user is installed, with reference to device information of each external device stored in the storage unit 130. The pairing processor 160 performs pairing with the another device by using the read pairing information. If the pairing with the another device is completed through the pairing processor 160 as described above, the controller 140 may receive login information from another paired device through the communicator 110 as described above.

For example, as shown in FIG. 2, application FACEBOOK™ is selected by the user, and login information of the selected application FACEBOOK™ may be requested from the paired mobile device 210. In this case, if the login information of the application FACEBOOK™ is not received from the mobile device 210 within a preset threshold time, the computing apparatus 220 performs pairing with a tablet PC 211 which is another device. If the pairing is completed between the tablet PC 211 and the computing apparatus 220, the computing apparatus 220 requests the login information of the application FACEBOOK™ from the paired tablet PC 211. If the login information of the application FACEBOOK™ is received from the paired table PC 211 within a preset threshold time, the computing apparatus 220 may perform an automatic login of the application FACEBOOK™ by using the received login information to display an operation screen 221 corresponding to the application FACEBOOK™ on a monitor.

If the login information of the application FACEBOOK™ is not received from the paired tablet PC 211, the computing apparatus 220 may perform pairing with another device, in which the application FACEBOOK™ is installed, to request the login information of the application FACEBOOK™ from the another device and receive the login information of the application FACEBOOK™ from the another device.

According to another aspect of the exemplary embodiment, the controller 140 of the computing apparatus may transmit login information of an application stored in the computing apparatus to an external device according to a request of the external device. In detail, if a login information request message for operating an application is received from a paired external device through the communicator 110, the controller 140 determines whether login information of the corresponding application has been stored in the storage unit 130, with reference to identification information of the application included in the received login information request message. If it is determined that the login information of the application has been stored in the storage unit 130, the controller 140 may transmit a response message including the stored login information to an external device. Therefore, the external device may perform a login of an application selected by the user by using the login information received from the computing apparatus.

As described above, if login information of an application corresponding to a request of a user is not pre-stored, the computing apparatus may receive login information of the corresponding application from an external device to perform a login. Also, the computing apparatus may provide requested login information of the application to the external device.

A method of operating an application in the computing apparatus according to the present disclosure will now be described with reference to FIG. 3.

Figure 3:
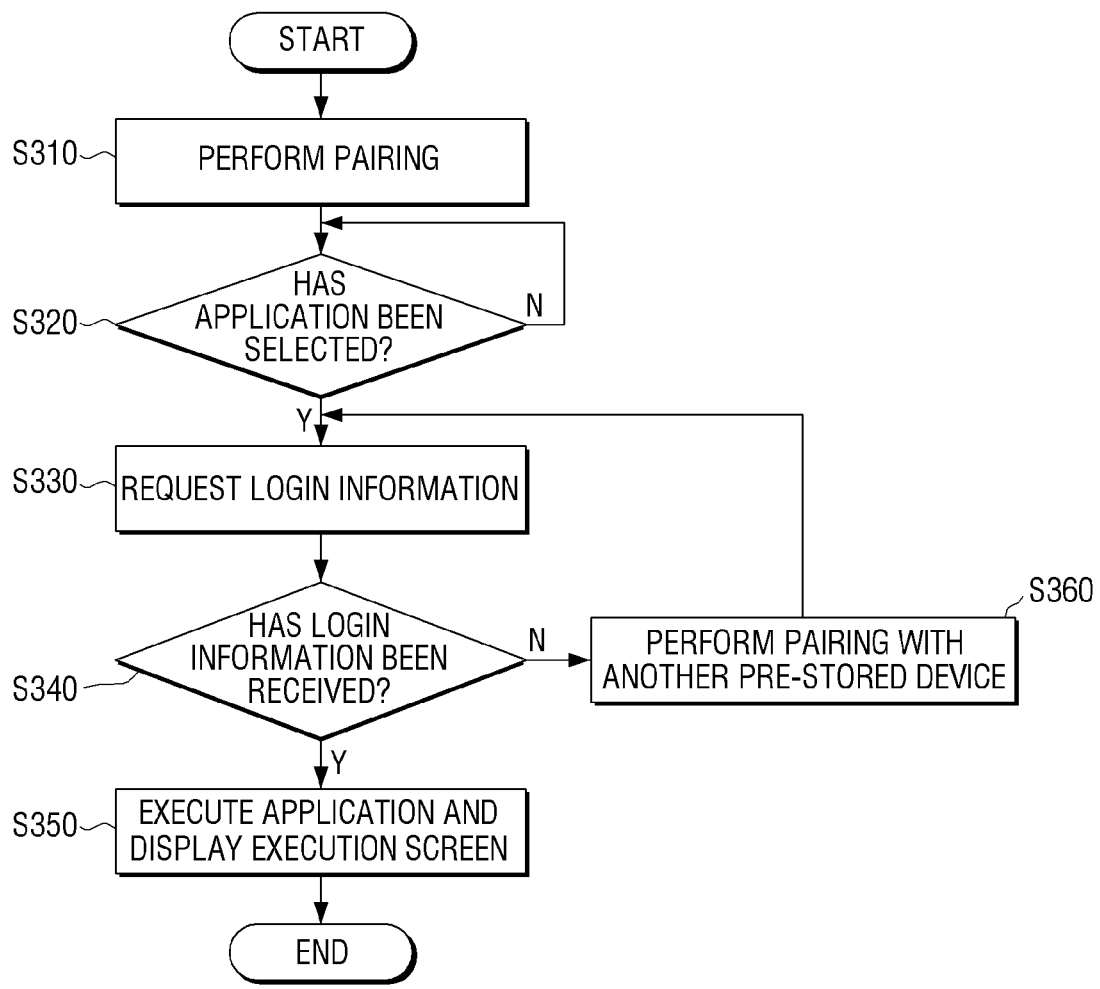
FIG. 3 is a flowchart illustrating a method of operating an application in a computing apparatus according to an exemplary embodiment.

FIG. 3 is a flowchart illustrating a method of operating an application in a computing apparatus according to an exemplary embodiment of the present inventive concept.

Referring to FIG. 3, in operation S310, the computing apparatus performs pairing for a wireless communication with one of peripheral external devices according to a request of a user. Here, the external device may be a wireless communication terminal device such as a mobile device, a tablet PC, or the like, and the external device and the computing apparatus may perform a data communication through the same wireless communication module. In operation S320, the computing apparatus periodically determines whether one of a plurality of applications which have been installed and stored has been selected by the user. If it is determined that one of the plurality of applications has been selected, the computing apparatus requests login information from an external device, which stores login information for operating the corresponding application, according to whether login information corresponding to the selected application has been stored, in operation S330.

In operation S340, the computing apparatus determines whether the requested login information has been received from the paired external device within a preset threshold time. If it is determined that the requested information has been received from the paired external device within the preset threshold time, the computing apparatus performs a login of the application selected by the user by using the login information received from the paired external device, and if the login is completed, displays an operation screen corresponding to the corresponding application in operation S350. If it is determined that the requested information has not been received from the paired external device within the preset threshold time, the computing apparatus performs pairing with another device using pairing information of the other device stored in a storage unit in operation S360. In detail, if there is a history of having been paired with at least one external device, the storage unit may store pairing information including identification information of the corresponding external device and application information which is operable in the corresponding external device.

Therefore, if the login information is not received from the paired external device within the preset threshold time, the computing apparatus determines that the login information for an automatic operation of the corresponding application has not been received in the paired external device and performs pairing with another device. Here, the computing apparatus may perform pairing with another device that is an external device in which an application selected by the user is installed, with reference to device information of each device stored in the storage unit.

If the pairing with the other device in which the application selected by the user is installed is completed, the computing apparatus requests login information from the other paired device through operation S330. The computing apparatus determines whether the login information has been received from the other paired device within a preset threshold time. If the login information has been received from the other paired device within the preset threshold time, the computing apparatus may operate the application by using the received login information. If the login information has not been received from the other paired device within the preset threshold time, the computing apparatus may perform pairing with another device to request login information from the another device.

A method of requesting login information from a paired external device in a computing apparatus will now be described with reference to FIG. 4.

Figure 4:
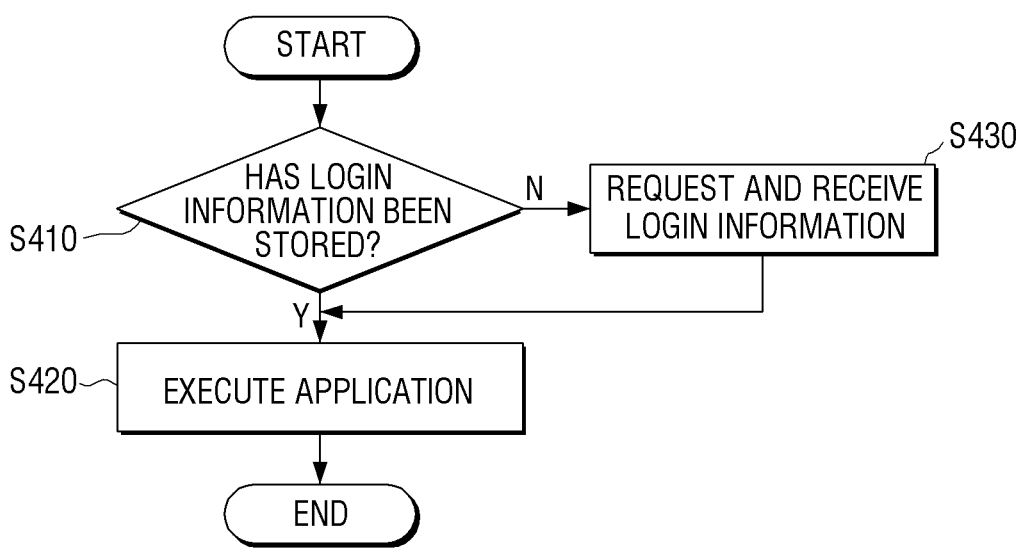
FIG. 4 is a flowchart illustrating a method of requesting login information from a paired external device in a computing apparatus according to an exemplary embodiment.

FIG. 4 is a flowchart illustrating a method of requesting login information from a paired external device in a computing apparatus according to an exemplary embodiment.

Referring to FIG. 4, if one of a plurality of pre-installed applications is selected by a user, the computing apparatus determines whether login information for an automatic login of the selected application has been stored in a storage unit in operation S410. If it is determined in operation S410 that the login information corresponding to the application selected by has been stored in the storage unit, the computing apparatus performs a login of the corresponding application by using the stored login information in operation S420.

If it is determined in operation S410 that the login information corresponding to the application selected by the user has not been stored in the storage unit, the computing apparatus requests the login information for the login of the corresponding application from a paired external device in operation S430. In detail, if the login information corresponding to the application selected by the user has not been stored, the computing apparatus transmits a login information request message including identification information of the application selected by the user to the paired external device.

The external device receives the login information request message and acquires login information corresponding to the application selected by the user from login information of pre-stored applications with reference to the identification information of the application included in the received login information request message. The paired external device transmits a response message including the acquired login information to the computing apparatus. Therefore, the computing apparatus may perform the login of the application selected by the user by using the login information included in the response message received from the paired external device.

A method of performing pairing with an external device in a computing apparatus according to the present inventive concept before using login information stored in the external device will now be described with reference to FIG. 5.

Figure 5:
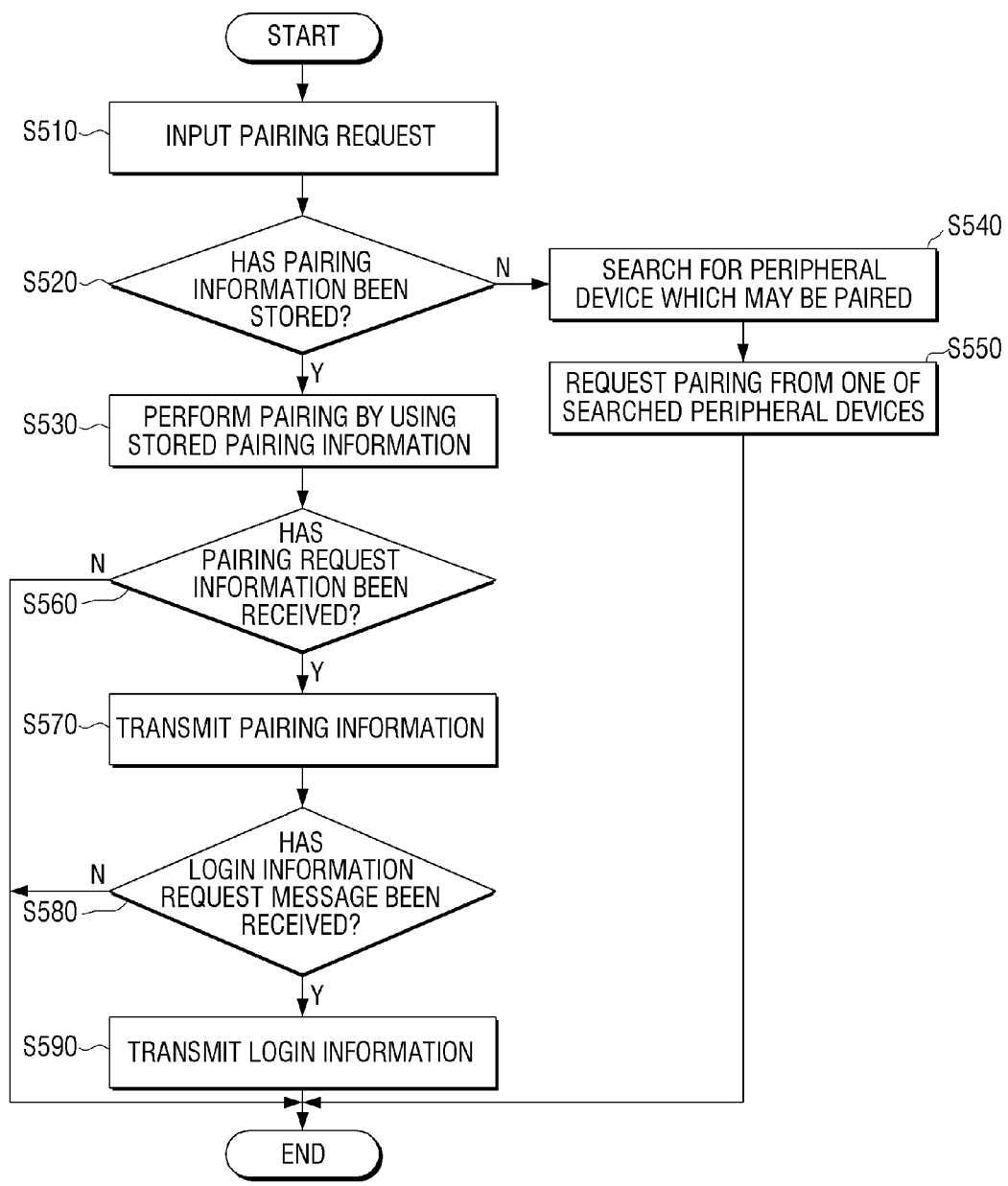
FIG. 5 is a flowchart illustrating a method of performing pairing with an external device in a computing apparatus according to an exemplary embodiment.

FIG. 5 is a flowchart illustrating a method of performing pairing with an external device in a computing apparatus according to an exemplary embodiment of the present inventive concept.

Referring to FIG. 5, the computing apparatus is to be paired with an external device which stores login information in order to use the login information of an application stored in the external device. In operation S510, the computing apparatus receives a pairing request from a first user in order to perform pairing with at least one external device. If the pairing request is input, the computing apparatus determines whether pairing information of the external device corresponding to the input pairing request has been stored in a storage unit in operation S520.

If there is a history of having been paired with at least one external device as described above, the storage unit may store pairing information including identification information of the corresponding external device. Therefore, if the pairing request is input, the computing apparatus may determine whether the pairing information of the external device corresponding to the pairing request has been stored, with reference to the storage unit. If it is determined that the pairing information of the external device corresponding to the pairing request has been stored, the computing apparatus reads the pairing information of the corresponding external device from the storage unit and performs pairing with the external device by using the stored pairing information in operation S530.

If it is determined that the pairing information of the external device corresponding to the pairing request has not been stored, the computing apparatus searches for a peripheral device which may be paired with the computing apparatus and displays a list of searched peripheral devices on a screen in operation S540. If the user selects one of the peripheral devices listed, the computing apparatus performs pairing with the selected peripheral device and stores pairing information of the paired peripheral device in the storage unit in operation S550.

The computing apparatus may perform pairing with at least one external device according to a request of the at least one external device and provide login information to the external device which has requested the pairing. In detail, in operation S560, the computing apparatus determines whether pairing request information has been received from the at least one external device. If it is determined in operation S560 that the pairing request information has been received from the at least one external device, the computing apparatus transmits pairing information including identification information thereof to the external device which has transmitted the pairing request information, in operation S570. When the computing apparatus is paired with the external device to which the pairing information has been transmitted, the computing apparatus determines whether a login information request message has been received from the corresponding external device in operation S580.

If it is determined in operation S580 that the login information request message has been received from the external device, the computing apparatus determines whether login information of a corresponding application has been stored, with reference to identification information of the application included in the received login information request message. If it is determined that the requested login information of the application has been stored, the computing apparatus may transmit a response message including the stored login information to the external device which has transmitted the login information request message. Therefore, the external device may perform a login of an application selected by a user by using the login information received from the computing apparatus.

As described above, if login information of an application corresponding to a request of a user has not been stored, a computing apparatus according to the present inventive concept may receive login information of the corresponding application from a peripheral external device to perform a login or may provide the requested login information of the application to the peripheral external device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
a communicator configured to communicate with a first external device;
a storage unit in which applications are installed;
a controller configured to search the storage unit for the login information corresponding to a selected one of the applications, configured to determine whether or not login information is stored in the storage unit, and in response to a determination that the login information is not stored in the storage unit, configured to control the communicator to request login information corresponding to an application from the first external device and perform a login by using the login information from the first external device; and
a display unit which displays an operation screen corresponding to the application,
wherein in response to the login information not being received from the first external device, the controller performs a pairing with a second external device for requesting the login information corresponding to the selected application,
wherein the first and the second external devices are devices where the login information corresponding to the selected one of the applications is stored or is being executed.

2. The display apparatus of claim 1, wherein the controller in response to a determination that the login information corresponding to the application is stored in the storage unit, performs the login by using the stored login information.

3. The display apparatus of claim 1, further comprising a pairing processor, wherein:
the storage unit stores pairing information comprising identification information of the first external device,
the communicator receives a pairing request from the first external device, and
the pairing processor reads the pairing information of the first external device from the storage unit and performs pairing with the first external device using the read pairing information.

4. The display apparatus of claim 3, further comprising a pairing processor,
wherein:
the storage unit stores pairing information comprising identification information of a plurality of external devices, and in response to a determination that the login information is not received from the first external device, the pairing processor searches for a second external device through the communicator and performs pairing with the second external device according to the device information stored in the storage unit.

5. The display apparatus of claim 3, wherein the pairing processor transmits pairing information comprising identification information for performing pairing to the first external device through the communicator.

6. The display apparatus of claim 1, wherein the controller transmits login information stored in the storage unit to a second external device.

7. A method of operating an application in a display apparatus, the method comprising:
performing pairing with a first external device;
searching in a storage unit for login information corresponding to a selected application;
determining whether or not the login information is stored in the storage unit;
in response to a determination that the login information is not stored in the storage unit, requesting login information corresponding to an application from the first external device and performing a login by using the received login information from the first external device;
displaying an operation screen corresponding to the selected application; and
in response to the login information not being received from the first external device, performing a pairing with a second external device for requesting the login information corresponding to the selected application,
wherein the first external device and the second external device are devices where the login information corresponding to the selected applications is stored or is being executed.

8. The method of claim 7, further comprising:
in response to a determination that the login information has been stored in the storage unit, performing the login by using the login information.

9. The method of claim 7, further comprising:
storing, in a storage unit, pairing information comprising identification information of the first external device;
receiving a pairing request from the first external device; and
performing pairing with the external device using the pairing information from the storage unit.

10. The method of claim 9, further comprising:
storing, in a storage unit, pairing information comprising identification information of a plurality of external devices; and
in response to a determination that the login information is not received from the first external device, performing pairing with the second external device using the identification information stored in the storage unit.

11. The method of claim 9, further comprising:
transmitting pairing information comprising identification information for performing pairing to the first external device.

12. The method of claim 7, further comprising:
transmitting login information stored in a storage unit of the display unit to the second external device.

13. A computing apparatus, comprising:
a communicator configured to communicate with a first external device;
a storage which stores login information corresponding to a plurality of applications; and a processor configured to search the storage for the login information corresponding to a selected application, configured to determine whether or not the login information is stored in the storage, and in response to a determination that the login information is not stored in the storage, the processor controls the communicator to request the login information from the first external device and perform a login by using the login information from the first external device, wherein in response to the login information not being received from the first external device, the processor performing a pairing with a second external device for requesting the login information corresponding to the selected application, and wherein the first external device and the second device are devices where the login information corresponding to the selected applications is stored or is being executed.

14. The computing apparatus of claim 13, wherein:
the storage stores pairing information comprising identification information of the first external device,
the communicator receives a pairing request from the first external device, and
the processor reads the pairing information of the first external device from the storage and performs pairing with the first external device using the pairing information.

15. The computing apparatus of claim 13, wherein:
the storage stores pairing information comprising identification information of a plurality of external devices, and
in response to a determination that the login information is not received from the first external device, the processor searches for the second external device through the communicator and performs pairing with the second external device according to the device information stored in the storage.

16. The computing apparatus of claim 13, further comprising a display which displays the application.

17. The computing apparatus of claim 13, further comprising an input receiver which receives user input.

18. The computing apparatus of claim 13, wherein the communicator sends and receives data over a network.

19. The computing apparatus of claim 13, wherein the processor transmits login information stored on the storage to the second external device through the communicator.

20. A display apparatus, comprising:
a communicator configured to communicate with a first external device;
a storage unit in which applications are installed;
a controller configured to perform a login by using login information corresponding to an application;
a display unit configured to display an operation screen corresponding to the application; and
a pairing processor,
wherein:
the storage unit stores pairing information comprising identification information of a plurality of external devices, and in response to a determination that the login information is not received from the first external device, the pairing processor searches for a second external device through the communicator, the second external device being selected from among a predetermined list of external devices, and performs pairing with the second external device according to the device information stored in the storage unit.

21. A method of operating an application in a display apparatus, the method comprising:
performing pairing with a first external device; requesting login information corresponding to an application from the first external device;
performing a login if the login information is received;
displaying an operation screen corresponding to the selected application;
storing, in a storage unit, pairing information comprising identification information of a plurality of external devices; and
in response to a determination that the login information is not received from the first external device, performing pairing with a second external device for requesting the login information corresponding to the selected application, using the identification information stored in the storage unit,
wherein the first external device and the second external devices are devices where the login information corresponding to the applications is stored or is being executed.

22. A computing apparatus, comprising:
a communicator configured to communicate with a first external device;
a processor configured to control the communicator to request login information corresponding to an application from the first external device, perform a login by using the login information if the login information is received, and output an image signal corresponding to the application; and
a storage,
wherein:
the storage stores pairing information comprising identification information of a plurality of external devices, and
in response to a determination that the login information is not received from the first external device, the processor searches for a second external device through the communicator and performs pairing with the second external device for requesting the login information corresponding to a selected application, according to the device information stored in the storage,
wherein the first external device and the second external device are devices where the login information corresponding to the applications is stored or is being executed.

* * * * *